US012705993B2

(12) United States Patent
Hiller

(10) Patent No.: US 12,705,993 B2
(45) Date of Patent: Aug. 11, 2026

(54) NONUNIFORM LASER BEAM SCAN BASED FLIGHT PATH CLEARING SYSTEM

(71) Applicant: The Boeing Company, Arlington, VA (US)

(72) Inventor: Nathan D. Hiller, Irvine, CA (US)

(73) Assignee: The Boeing Company, Arlington, VA (US)

( * ) Notice: Subject to any disclaimer, the term of this patent is extended or adjusted under 35 U.S.C. 154(b) by 60 days.

(21) Appl. No.: 18/791,615

(22) Filed: Aug. 1, 2024

(65) Prior Publication Data

US 2026/0038379 A1 Feb. 5, 2026

(51) Int. Cl.
*G08G 5/80* (2025.01)
*B64D 47/06* (2006.01)

(52) U.S. Cl.
CPC ............... *G08G 5/80* (2025.01); *B64D 47/06* (2013.01)

(58) Field of Classification Search
CPC .................................. G08G 5/80; B64D 47/06
See application file for complete search history.

(56) References Cited

U.S. PATENT DOCUMENTS 5,465,142 A * 11/1995 Krumes ................ G01S 17/933 359/201.1
12,505,753 B2 * 12/2025 Hiller ....................... G08G 5/80
2020/0172265 A1 * 6/2020 Kestler .................. B64D 47/06
2020/0341117 A1 * 10/2020 Sandford ................ G01S 17/93
2022/0380023 A1 * 12/2022 Takahashi ................ G08G 5/26

FOREIGN PATENT DOCUMENTS

CN 113507579 A 10/2021
CN 116318394 A 6/2023
CN 117811656 A 4/2024

OTHER PUBLICATIONS

Friederichs et al., "Vibration Influence on Hit Probability During Beaconless Spatial Acquisition," Journal of Lightwave Technology, vol. 34, No. 10, pp. 2500-2509, https://ieeexplore.ieee.org/document/7434577.
Hiller, "Changing Laser Scan for Satellite Acquisition," U.S. Appl. No. 18/791,572, filed Aug. 1, 2024, 74 pages.
Hiller, "Variable Scan Parameter Based Laser Sensor System," U.S. Appl. No. 18/791,594, filed Aug. 1, 2024, 59 pages.

* cited by examiner

*Primary Examiner* — Donald J Wallace
(74) *Attorney, Agent, or Firm* — Yee & Associates, P.C.

(57) ABSTRACT

A method for clearing a flight path. A number of characteristics is selected for a laser beam based on an object type. The laser beam is emitted with the number of characteristics in a direction relative to a flight path of the aircraft. The laser beam with the number of characteristics selected for the object type is moved to scan an area using a path from a central location to an outer location of the area. A number of scan parameters is adjusted during scanning the area using the path. A number of objects of the object type hit by the laser beam is cleared from the flight path.

22 Claims, 9 Drawing Sheets

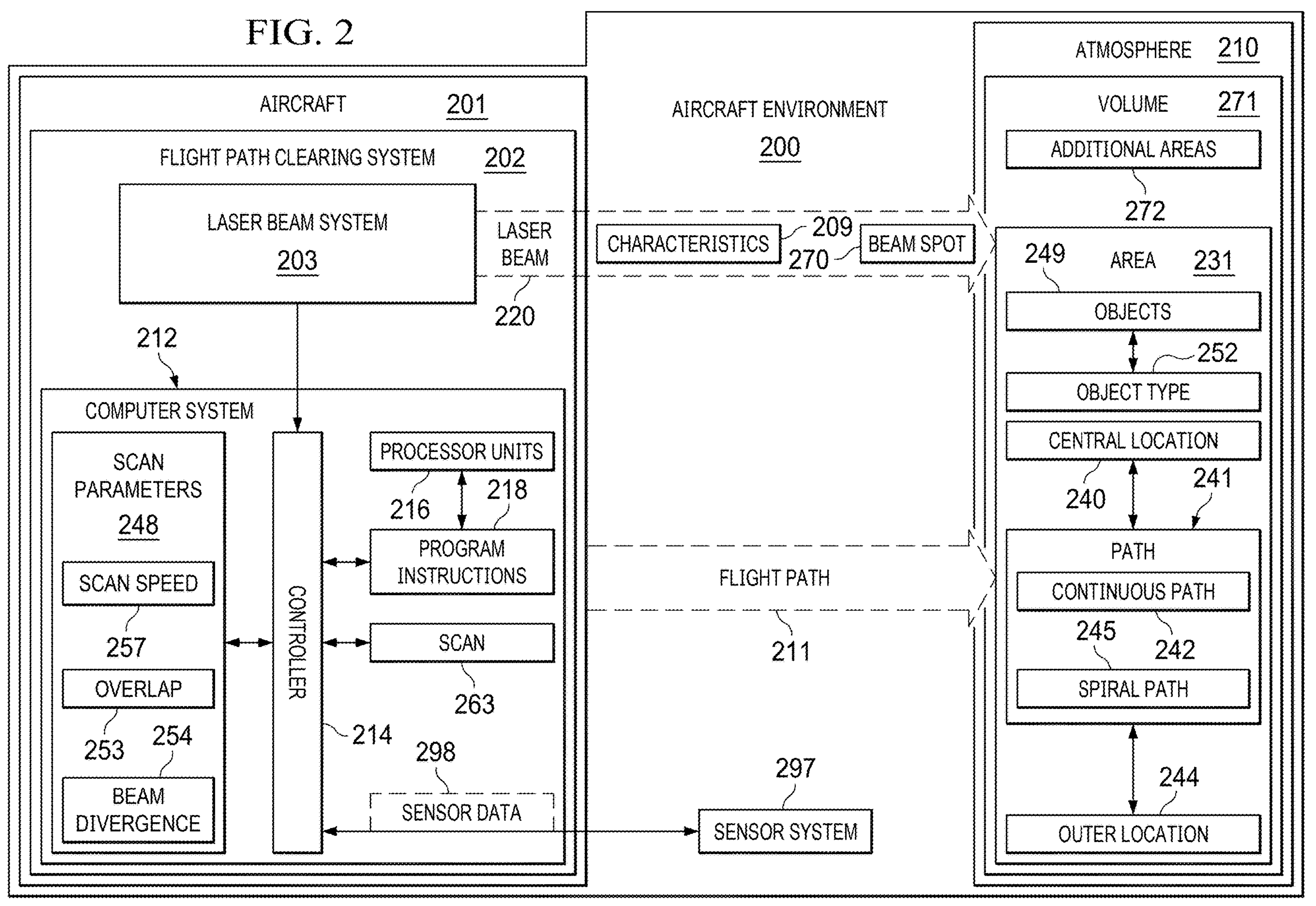
FIG. 2
AIRCRAFT 201
FLIGHT PATH CLEARING SYSTEM 202
LASER BEAM SYSTEM
203
LASER BEAM
220
212
COMPUTER SYSTEM
SCAN PARAMETERS
248
SCAN SPEED
257
OVERLAP
253
254
BEAM DIVERGENCE
CONTROLLER
214
PROCESSOR UNITS
216
218
PROGRAM INSTRUCTIONS
SCAN
263
298
SENSOR DATA
AIRCRAFT ENVIRONMENT
200
CHARACTERISTICS
209
270
BEAM SPOT
FLIGHT PATH
211
297
SENSOR SYSTEM
ATMOSPHERE 210
VOLUME 271
ADDITIONAL AREAS
272
249
AREA 231
OBJECTS
252
OBJECT TYPE
CENTRAL LOCATION
240
241
PATH
CONTINUOUS PATH
245
242
SPIRAL PATH
244
OUTER LOCATION

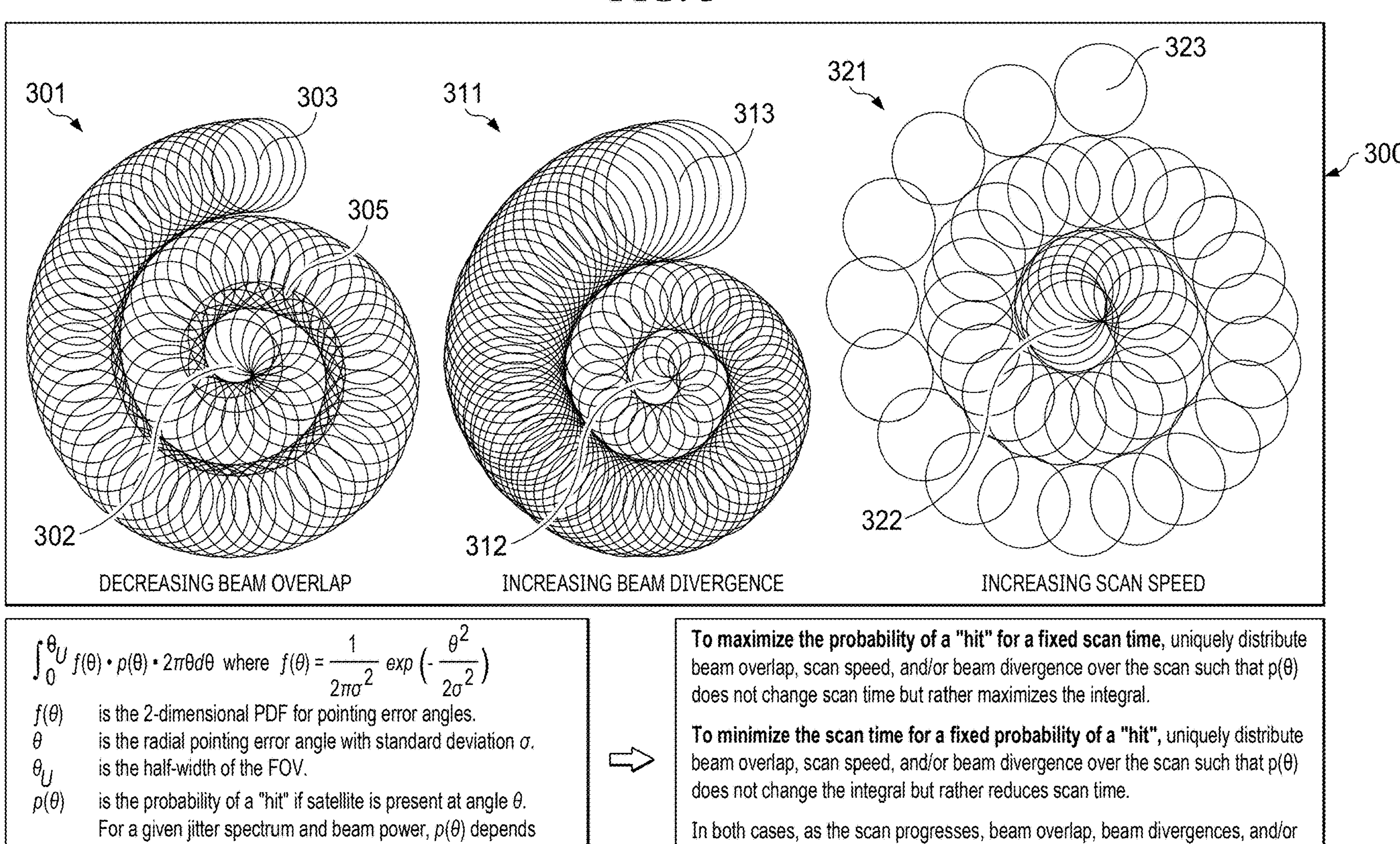
FIG. 3
300
301
303
305
302
DECREASING BEAM OVERLAP
311
313
312
INCREASING BEAM DIVERGENCE
321
323
322
INCREASING SCAN SPEED
$\int_0^{\theta_U} f(\theta) \cdot p(\theta) \cdot 2\pi\theta d\theta$ where $f(\theta) = \frac{1}{2\pi\sigma^2} exp\left(-\frac{\theta^2}{2\sigma^2}\right)$
$f(\theta)$ is the 2-dimensional PDF for pointing error angles.
$\theta$ is the radial pointing error angle with standard deviation $\sigma$.
$\theta_U$ is the half-width of the FOV.
$p(\theta)$ is the probability of a "hit" if satellite is present at angle $\theta$. For a given jitter spectrum and beam power, $p(\theta)$ depends on beam overlap, scan speed, and beam divergence.
To maximize the probability of a "hit" for a fixed scan time, uniquely distribute beam overlap, scan speed, and/or beam divergence over the scan such that p(θ) does not change scan time but rather maximizes the integral.
To minimize the scan time for a fixed probability of a "hit", uniquely distribute beam overlap, scan speed, and/or beam divergence over the scan such that p(θ) does not change the integral but rather reduces scan time.
In both cases, as the scan progresses, beam overlap, beam divergences, and/or scan speed, should generally decrease, increase, and increase, respectively.

NONUNIFORM LASER BEAM SCAN BASED FLIGHT PATH CLEARING SYSTEM

STATEMENT OF GOVERNMENT INTEREST

This invention was made with United States Government support. The United States Government has certain rights in the invention.

CROSS-REFERENCE TO RELATED APPLICATIONS

This application is related to U.S. patent application Ser. No. 18/791,572, entitled "Changing Laser Scan for Satellite Acquisition," and U.S. patent application Ser. No. 18/791,594, entitled "Variable Scan Parameter Based Laser Sensor System," both filed Aug. 1, 2024, assigned to the same assignee, and incorporated herein by reference in its entirety.

BACKGROUND INFORMATION

1. Field

The present disclosure relates generally to aircraft and in particular, to clearing flight paths for aircraft.

2. Background

In operating commercial airplanes, optimal performance of these airplanes occurs under clean conditions. Having clean aerodynamic surfaces such as wings, fuselage, and other locations are needed to provide a smooth flow of air. Debris, dirt, residue, or other material can disrupt the desired airflow resulting in decreased aerodynamic performance.

One source of decreased aerodynamic performance results from insect residue that occurs from insects impacting the surfaces of an airplane. The insect residue from impacts with flying insects can increase the surface roughness of an airplane including the leading edges of wings, the nose of the aircraft, and other locations.

With respect to the aircraft wings, this type of rough surface can promote an earlier transition from laminar to turbulent airflow. This and other types of airflow disruption increases the drag. As a result, the engines of aircraft work harder to maintain the same speed with the increased drag. The situation results in increased fuel use and decreased fuel efficiency.

Further, this type of insect residue can also interfere with sensors on the exterior of the aircraft. As a result, the accuracy of readings from air speed, angle of attack, and other parameters can be impacted by insect residue.

SUMMARY

An embodiment of the present disclosure provides a flight path clearing system comprising a laser beam system and a controller. The laser beam system is in an aircraft. The controller is configured to select a number of characteristics for a laser beam based on an object type. The controller is configured to control the laser beam system to emit the laser beam with the number of characteristics in a direction relative to a flight path of the aircraft. The controller is configured to control the laser beam system to move the laser beam with the number of characteristics selected for the object type to scan an area using a path from a central location to an outer location of the area. The controller is configured to control the laser beam system to adjust a number of scan parameters during scanning the area using the path, wherein a number of objects of the object type hit by the laser beam is cleared from the flight path.

Another embodiment of the present disclosure provides a method for clearing a flight path. A number of characteristics is selected for a laser beam based on an object type. The laser beam is emitted with the number of characteristics in a direction relative to a flight path of the aircraft. The laser beam with the number of characteristics selected for the object type is moved to scan an area using a path from a central location to an outer location of the area. A number of scan parameters is adjusted during scanning the area using the path. A number of objects of the object type hit by the laser beam is cleared from the flight path.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 is an illustration of a block diagram of an aircraft environment in accordance with an illustrative embodiment;

FIG. 3 is an illustration of a continuous spiral scan system in accordance with an illustrative embodiment;

DETAILED DESCRIPTION

The illustrative embodiments recognize and take into account one or more different considerations as described herein. For example, reduced aerodynamic performance occurs with insect residue on the surface of an aircraft. This insect residue results from flying insects impacting the surface of an aircraft. The illustrative examples also recognize and take into account that unintended impacts with other objects can reduce the performance or cause inconsistencies in the aircraft.

Currently, sensors such as object detection systems can be used to detect birds and insects. With the detection of objects ahead of the aircraft, pilots can take evasive action as needed. These actions, however, may reduce the passenger experience. In other cases, pilots are trained to take action in response to an action impact with insects or birds. It would be desirable, however, to avoid situations where evasive maneuvers or impacts occur.

Thus, a method, apparatus, system, and computer program product for clearing a flight path is provided. In one illustrative example, a flight path clearing system comprises a laser beam system in an aircraft and a controller. The laser beam system is in an aircraft. The controller is configured to select a number of characteristics for a laser beam based on an object type. The controller is configured to control the laser beam system to emit the laser beam with the number of characteristics in a direction relative to a flight path of the aircraft. The controller is configured to control the laser beam system to move the laser beam with the number of characteristics selected for the object type to scan an area using a path from a central location to an outer location of the area. The controller is configured to control the laser beam system to adjust a number of scan parameters during scanning the area using the path, wherein a number of objects of the object type hit by the laser beam is cleared from the flight path.

Figure 1:
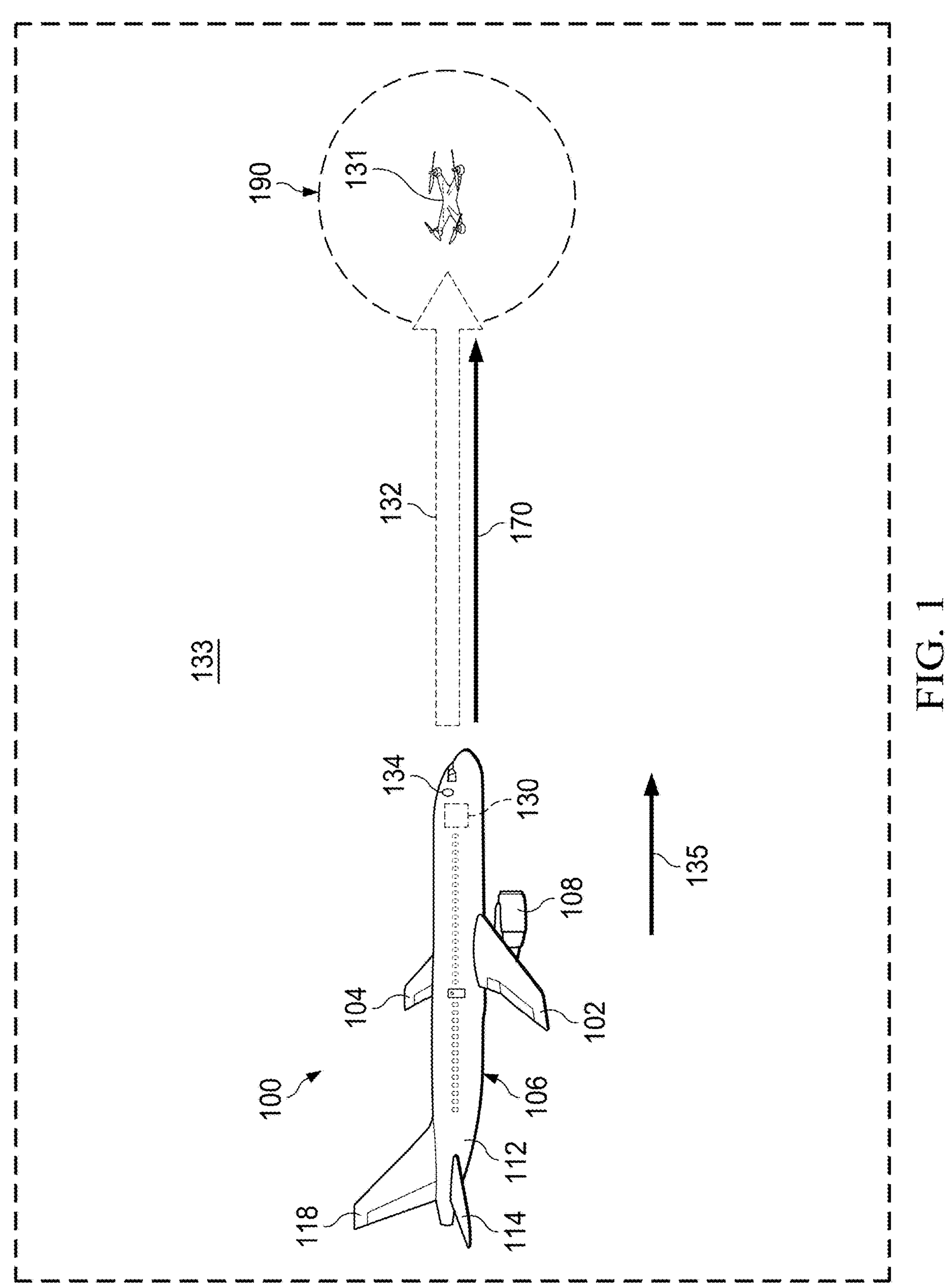
FIG. 1 is an illustration of an aircraft in accordance with an illustrative embodiment.

With reference now to the figures and, in particular, with reference to FIG. 1, an illustration of an aircraft clearing a path is depicted in accordance with an illustrative embodiment. In this illustrative example, in aircraft environment 133 commercial airplane 100 has wing 102 and wing 104 attached to body 106. In some examples, body 106 can also be referred to as the fuselage. Engine 108 is attached to wing 102. In this view of commercial airplane 100, another engine is attached to wing 104 but not seen in this view.

Body 106 has tail section 112. Horizontal stabilizer 114 and vertical stabilizer 118 are attached to tail section 112 of body 106. Another horizontal stabilizer is present but not shown in this view.

Commercial airplane 100 is an example of an air vehicle in which flight path clearing system 130 can be implemented in accordance with an illustrative embodiment. In this illustrative example, flight path clearing system 130 scans the environment around commercial airplane 100 to clear objects that may be in the flight path of commercial airplane 100. Further, with the use of flight path clearing system 130, the pilot for an aircraft management system can operate commercial airplane 100 without a need to take evasive maneuvers or take action because of impacts with objects such as drone 131.

In this illustrative example, flight path clearing system 130 operates to emit laser beam 132 from port 134 of commercial airplane 100. As depicted, laser beam 132 is emitted in a forward direction 135 relative to flight path 170 of commercial airplane 100. In this illustrative example, flight path clearing system 130 is operated to move laser beam 132 to scan area 190 ahead of the direction of travel of commercial airplane 100. The dimensions of area 190 can be based on the wingspan of commercial airplane 100. For example, if the wingspan is 60 meters, the diameter of area 190 can be 60 meters.

By scanning area 190 with laser beam 132, objects such as drone 131 can be cleared from flight path 170 of commercial airplane 100. In this example, laser beam 132 has characteristics suitable for clearing drone 131 from flight path 170. For example, at least one of a wavelength, intensity, power, or other characteristic of laser beam 132 can be selected to cause drone 131 to move out of or away from flight path 170. For example, the characteristics can be selected to affect the navigation system or other components of drone 131 such that drone 131 is unable to maintain altitude or course that is within flight path 170.

In this illustrative example, the scanning of area 190 can be performed by flight path clearing system 130 moving laser beam 132 on a path in area 190. This path can be a continuous path such as a spiral path.

Further, with the use of flight path clearing system 130, the pilot for an aircraft management system can operate commercial airplane 100 without a need to take evasive maneuvers or take action because of impacts with objects such as drone 131.

FIG. 1 is intended as an example and not as an architectural limitation for the different illustrative examples. For example, laser beam 132 can be embedded from other locations other than port 134 in body 106. In another illustrative example, laser beam 132 can be emitted from a port located in wing 104, horizontal stabilizer 114, vertical stabilizer 118, or other suitable locations.

A number of objects other than drone 131 may be cleared from flight path 170. For example, flight path clearing system 130 can be used to clear objects selected from at least one of a bird, an insect, a weather ballon, or drone from flight path 170.

As used herein, a "number of" when used with reference to items means one or more items. For example, a number of objects is one or more objects.

The phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

The scanning of area 190 by flight path clearing system 130 with laser beam 132 can clear objects within area 190 through which flight path 170 passes. Flight path 170 can be made much faster as compared to a pilot or other person performing an analysis to identify and emit a laser beam to clear objects from flight path 170. The pilot or other operator may not be able to identify and clear objects from flight path 170 with sufficient time to avoid impact with those objects as compared to flight path clearing system 130 automatically emitting and moving laser beam 132 to scan area 190. A human operator cannot practically perform these operations quickly enough in real time to clear objects with a desired level of accuracy from flight path 170 of commercial airplane 100.

With reference now to FIG. 2, a block diagram of an aircraft environment is depicted in accordance with an illustrative embodiment. In this illustrative example, aircraft environment 200 includes components that can be implemented in hardware in an aircraft such as commercial airplane 100 in FIG. 1.

In this illustrative example, flight path clearing system 202 operates to clear objects 249 in atmosphere 210 from flight path 211 on aircraft 201. In this example, flight path clearing system 202 is located in aircraft 201.

Aircraft 201 can take a number of different forms. For example, aircraft 201 can be selected from a group comprising a commercial aircraft, a cargo airplane, a rotorcraft, a fixed wing aircraft, a tilt-rotor aircraft, a tilt wing aircraft, a vertical takeoff and landing aircraft, an electrical vertical takeoff and landing vehicle, a glider, a personal air vehicle, an artificial intelligence controlled air vehicle, and other types of aircraft that can fly in atmosphere 210.

As depicted, flight path clearing system 202 comprises laser beam system 203, computer system 212, and controller 214. Controller 214 is located in computer system 212. These components are located within aircraft 201 in this illustrative example.

Laser beam system 203 is a hardware system and can include software. Laser beam system 203 can be selected from at least one of a gas laser beam system, a carbon dioxide laser beam system, or other suitable type of laser beams system. In other words, laser beam system 203 can be comprised of multiple different types of laser beams systems.

In this example, laser beam system 203 emits laser beam 220 into atmosphere 210 during flight of aircraft 201. Laser beam 220 is selected from a group comprising a continuous laser beam and a pulsed laser beam. Laser beam 220 can be a type of laser beam selected from a group comprising a CO2 laser beam, an infrared laser beam, a visible light laser beam, and other suitable types of laser beams. Further, laser beam 220 can be linearly polarized.

In this illustrative example, laser beam 220 is emitted by laser beam system 203 in a direction relative to flight path 211 of aircraft 201. In other words, laser beam 220 can be emitted by laser beam system 203 from aircraft 201 in the direction that is relative to flight path 211. By being relative to flight path 211, laser beam 220 does not have to be directly on flight path 211.

For example, controller 214 can control laser beam system 203 to emit laser beam 220 and move laser beam 220 to locations in area 231. Area 231 is an area through which flight path 211 of aircraft 201 extends. For example, flight path 211 can extend through central location 240 and in particular to the center of central location 240, which is the center of area 231.

Area 231 can have dimensions based on the aircraft 201. For example, area 231 can have a diameter that is at least the size of the wingspan of aircraft 201. Further, a 231 can have a number of different shapes. For example, area 231 can have a shape selected from a group comprising a circle, an ellipse, or some other suitable shape.

Controller 214 can be implemented in software, hardware, firmware or a combination thereof. When software is used, the operations performed by controller 214 can be implemented in program instructions configured to run on hardware, such as a processor unit. When firmware is used, the operations performed by controller 214 can be implemented in program instructions and data can be stored in persistent memory to run on a processor unit. When hardware is employed, the hardware can include circuits that operate to perform the operations in controller 214.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field-programmable logic array, a field-programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Computer system 212 is a physical hardware system and includes one or more data processing systems. When more than one data processing system is present in computer system 212, those data processing systems are in communication with each other using a communications medium. The communications medium can be a network. The data processing systems can be selected from at least one of a computer, a server computer, a tablet computer, or some other suitable data processing system.

As depicted, computer system 212 includes a number of processor units 216 that are capable of executing program instructions 218 implementing processes in the illustrative examples. In other words, program instructions 218 are computer-readable program instructions.

As used herein, a processor unit in the number of processor units 216 is a hardware device and is comprised of hardware circuits such as those on an integrated circuit that respond to and process instructions and program code that operate a computer.

When the number of processor units 216 executes program instructions 218 for a process, the number of processor units 216 can be one or more processor units that are in the same computer or in different computers. In other words, the process can be distributed between processor units 216 on the same or different computers in computer system 212.

Further, the number of processor units 216 can be of the same type or different types of processor units. For example, the number of processor units 216 can be selected from at least one of a single core processor, a dual-core processor, a multi-processor core, a general-purpose central processing unit (CPU), a graphics processing unit (GPU), a digital signal processor (DSP), or some other type of processor unit.

In this illustrative example, controller 214 identifies object type 252 for a number of objects 249. This identification can be made using sensor system 297. Sensor system 297 is a hardware system and can include software. Sensor system 297 can be located in aircraft 201 or can be in a remote location. This remote location can be, for example, a ground station, another aircraft, a satellite, or some other location. Sensor system 297 can be at least one of a radar system, a lidar, a camera, a visible light camera, a thermal camera, or some other suitable type of sensor system that can be used to detect objects 249 and obtain sensor data 298 that can be used to determine object type 252.

Sensor system 297 sends sensor data 298 to controller 214. This sensor data can be analyzed by controller 214 to identify object type 252 for the number of objects 249.

Controller 214 identifies a number of characteristics 209 for laser beam 220 based on object type 252 for the number of objects 249. In this illustrative example, the number of characteristics 209 is based on characteristics that can be used to clear the number of objects 249 from flight path 211.

Object type 252 is for objects 249. Each object in objects 249 has an object type. Object type 252 can be from a group comprising an insect, a bird, an aerial drone, and other types of objects that may need to be cleared from flight path 211 of aircraft 201.

The number of characteristics 209 can include at least one of a wavelength, focal length, a power, a timing, an intensity, or other characteristics. In this example, a focal length of laser beam 220 is selected such that laser beam 220 scans area 231 at a distance from aircraft 201 that enables laser beam 220 to effectively clear flight path 211. The distance is such that laser beam 220 can scan area 231 with sufficient time to clear an object from flight path 211 without the object hitting aircraft 201.

One characteristic in the number of characteristics 209 of laser beam 220 is a wavelength selected for absorption by at least one of an insect exoskeleton, a bird feather, a plastic, and a metal. As another example, the wavelength selected is eye-safe for birds. In another example, the timing of laser beam 220 is selected from a group comprising pulsed and continuous.

In another illustrative example, controller 214 controls laser beam system 203 to emit laser beam 220 with the number of characteristics 209 in a direction relative to flight path 211 of aircraft 201. Controller 214 also controls laser beam system 203 to move the laser beam with the number of characteristics 209 selected for object type 252 to scan area 231 using path 241 from central location 240 to outer location 244 of area 231.

In this example, laser beam 220 has beam spot 270 at area 231. Beam spot 270 is a region covered by laser beam 220. In this example, beam spot 270 is circular and has a size that can be adjusted. By moving laser beam 220 from location to location, beam spot 270 also moves from location to location in area 231 along path 241.

Path 241 can take a number of different forms. In this example, path 241 can be continuous path 242. Path 241 is a continuous path when beam spot 270 moves to adjacent locations without gaps between the locations in path 241. In this example, path 241 has a pattern in the form of spiral path 245. Spiral path 245 begins at central location 240 and extends outward in a continuously curving trajectory to reach outer location 244. As spiral path 245 spirals outwards, each successive spiral is larger than the previous spiral.

In this example, controller 214 adjusts a number of scan parameters 248 during scanning of area 231 using path 241. In this example, the number of scan parameters 248 can be selected from at least one of scan speed 257, overlap 253, or beam divergence 254. As a result, a number of objects 249 of object type 252 hit by laser beam 220 is cleared from flight path 211. The number of scan parameters 248 can be adjusted to increase the ability of laser beam 220 to hit an object in area 231 more quickly or accurately. In this manner, the number of scan parameters 248 can be adjusted to more effectively clear area 231 of a number of objects 249.

For example, clearing an aerial drone as the number of objects from flight path 211 can comprise causing, at least one of interference with the navigation system of the aerial drone the aerial drone to fly outside of the flight path of the aircraft, damage to the aerial drone, or destruction of the aerial drone such that the aerial drone moves away from flight path 211 of aircraft 201. In yet another example, objects 249 in the form of birds and insects can be cleared from flight path 211.

A number of factors is considered in adjusting the number of scan parameters 248 during movement of laser beam 220 along spiral path 245 to clear objects 249 from area 231 around flight path 211. In these examples, objects 249 can be flying objects such as insects, birds, and aerial trends. In this example, objects 249 flying closest to flight path 211 are more likely to create a hazard for aircraft 201 as compared to objects 249 flying further away from flight path 211. With this example, laser beam 220 is moved to scan area 231 beginning at central location 240 that is on flight path 211. Laser beam 220 is progressively moved further away from central location 240 until laser beam 220 reaches the end of spiral path 245 at outer location 244. In this example, the scan time to form scan 263 can be limited to provide effective clearing of objects 249 from area 231.

The scan time (ST) is dependent on the speed of the aircraft relative to the air (V), the distance to the location of the scanned region in space (L), and the response time of the objects (RT) after being struck by the laser beam. The response time (RT) is the time it takes for laser ablation of the objects or for the objects to fall away from the flight path. In this example, the scan time (ST) can be determined as follows:

$$ST<TT-RT \text{ where } TT=L/V$$

For example, take an aircraft traveling at 200 m/s and a location to be scanned that is 2,000 meters away from the aircraft. If it typically takes 3 seconds for damaged insects to fall away from the flight path then RT=3 (s) which is determined a follows:

$$ST<2000\text{ m}/200\text{ m/s}-3\text{s}=10\text{s}-3\text{s}=7\text{s}$$

With this example, a number of scan parameters 248 can be adjusted to increase the effectiveness of clearing flying objects from area 231. If a flying object is present at a particular location in atmosphere 210, the probability of clearing that flying object from that location can be increased by performing adjustments to the number of scan parameters 248 selected from at least one of decreasing beam divergence 254 or increasing overlap 253.

With respect to beam divergence 254, a flying object closest to flight path 211 is more important to clear as compared to other objects in locations father away from flight path 211. Decreasing beam divergence 254 results in a decrease in the size of beam spot 270. As a result, an increased number of spirals occurs to enable beam spot 270 to cover area 231 when moving on spiral path 245. To avoid or reduce increasing scan time, beam divergence 254 is increased as laser beam 220 moves along spiral path 245. This increase can be continuous or along different portions of spiral path 245. This increase in beam divergence increases the size of beam spot 270, increasing the coverage by laser beam 220 of area 231 when moving on spiral path 245. However, this increase in beam divergence 254 reduces the beam power of laser beam 220.

In this example, beam divergence 254 can be smallest on spiral path 245 at central location 240 resulting in the greatest amount of beam power for laser beam 220. Increasing beam divergence 254 as scan 263 progresses along spiral path 245 to outer location 244 can reduce the amount of time for scan 263 as compared to using the same beam divergence for all of spiral path 245.

With respect to scan speed 257, clearing a flying object closest to flight path 211 is more important as compared to an object father away from flight path 211 at the periphery of area 231. A slower scan speed makes it more likely that an object is cleared. For example, the more time that laser beam 220 spends on the flying object, the likelihood that the flying object will be cleared is increased. However, the slower scan speed can increase the amount of time needed to perform scan 263. As a result, the scan time can be increased as laser beam 220 moves along spiral path 245 from central location 240 to outer location 244. As a result, the slowest scan time is at central location 240 which is of greater importance as compared to outer location 244 which is of a lower importance to clear as compared to central location 240.

With respect to the importance of clearing a flying object closer to flight path 211 as compared to being father away from flight path 211 with limited scan time, overlap 253 between adjacent portions of spiral path 245 has the greatest overlap at central location 240 and the least overlap at outer location 244. This adjustment of overlap 253 can be performed to avoid increasing the number of spiral scans on spiral path 245 which avoids increasing the scan time.

In one illustrative example, one or more technical solutions are present that overcome a problem with increasing the speed or effectiveness at which an area can be cleared using a laser beam. Computer system 212 can be configured to perform at least one of the steps, operations, or actions described in the different illustrative examples using software, hardware, firmware or a combination thereof.

In this example, controller 214 transforms computer system 212 into a special purpose computer system as compared to currently available general computer systems that do not have controller 214. In the illustrative example, the use of controller 214 in computer system 212 integrates processes into a practical application for the laser beam to clear objects from an area using a path from the central location to an outer location and adjusting scan parameters during scanning of the area using the path. In these examples, controller 214 in computer system 212 is directed to a practical application of processes integrated into controller 214 in computer system 212 that enables making clearing objects in an area through which a flight path extends more quickly as compared to current techniques. These processes can be performed without increasing the amount of scan time that occurs without making adjustments to scan parameters.

The illustration of aircraft environment 200 in FIG. 2 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, flight path clearing system 202 and one or more laser beams in addition to laser beam 220 form laser beam system 203. The emission of the laser beams can be used to scan one or more of additional areas 272 in addition to area 231. In this example, the additional areas 272 and area 231 form volume 271. In this manner, laser beam system 203 can be used to clear objects 249 from within volume 271.

Further, these additional scan areas can be at different distances from aircraft 201. The additional laser beams can use paths that have the same shape or a different shape as path 241. As another example, additional areas 272 can be scanned using paths in the form of spiral paths in which a number of scan parameters 248 may be adjusted differently from the number of scan parameters 248 adjusted for path 241.

With reference next to FIG. 3, an illustration of a continuous spiral scan system is depicted in accordance with an illustrative environment. In this illustrative example, spiral scans 300 are continuous spiral scans that have continuous paths. In this example, the different spiral scans depicted have scan parameters. The scan parameters are examples of the number of scan parameters 248 in FIG. 2.

For example, spiral scan 301 is an example of decreasing beam overlap. As depicted, spiral scan 301 is comprised of locations for a beam spot in which each location is the location of the beam spot as the beam spot moves along a spiral path over time. The beam spot is represented by the circles for the locations and the beam spot moves in performing spiral scan 301. The center of each circle is the location at which the laser beam is pointed in this example.

The laser beam is pointed at a location. The diameter of each beam spot is dependent on the beam divergence and how far the beam has propagated. In spiral scan 301 the divergence is fixed. Divergence is the angle at which a laser beam spreads as the laser beam propagates.

With this example, the beam spot size is dependent on the distance of the location from the laser source. For example, a laser beam directed at an object at a location that is a first distance away from a laser source will have a first beam spot size. The laser beam directed at an object at a second location that is a second distance from the laser source will have a larger diameter if that second distance is greater than the first distance.

In this illustrative example, the beam spot for spiral scan 301 has the same diameter because the beam spot moves in a spiral path in an area where all of the locations are the same distance away from the laser beam source.

These locations are represented by circles. These locations are in a search area for spiral scan 301.

In this example, spiral scan 301 starts from central location 302 and moves from location to location on the spiral path to outer location 303. The direction of motion is in the direction from central location 302 to outer location 303. These locations from central location 302 to outer location 303 illustrate the spiral path for spiral scan 301. In this example, central location 302 is the innermost circle and outer location 303 is the outermost circle in spiral scan 301.

In this example, overlap 305 is present between the locations in spiral scan 301. Overlap 305 is the overlap between locations in adjacent portions of the spiral path for the locations from central location 302 to outer location 303.

For example, an overlap between two locations in spiral scan 301 can be the overlap between a first location on the spiral path and a second location that is perpendicular to the direction of motion of the laser beam on the spiral path.

In this example, the amount of overlap 305 decreases as the beam spot moves from central location 322 to outer location 323 along the spiral path. The amount of overlap 305 is greatest at central location 322 and the amount of overlap 305 is the least at outer location 323.

Next, spiral scan 311 is an example of increasing beam divergence. In this example, spiral scan 311 is comprised of locations for a beam spot in which each location is the location of the beam spot as the beam spot moves along a spiral path with a direction of motion starting at central location 312 and ending at outer location 313.

This scan shows an increasing divergence as the scan progresses from central location 312 to outer location 313. In this example, divergence of a laser beam can be from the laser beam source by changing the optical configuration of the laser beam source. This change in optical configuration can change the angle at which the laser beam diverges.

The divergence is the size of the beam spot in this example. The size of the beam spot is the size of the circles representing the locations for the beam spot in spiral scan 311. For example, central location 312 has a smaller divergence as compared to outer location 313.

Spiral scan 321 is an example of increasing scan speed. As depicted, spiral scan 321 is comprised of locations for a beam spot in which each location is the location of the beam spot as the beam spot moves along a spiral path with a direction of motion starting at central location 322 and ending at outer location 323. These locations are represented by circles with central location 302 being the innermost circle and outer location 303 being the outermost circle in spiral scan 301.

In this example, the speed of spiral scan 321 increases as the beam spot moves along a spiral path from central location 322 to outer location 323. The increasing speed is depicted by the distance between locations along the spiral path. As depicted, the distance between locations along the spiral path increases indicating an increase in scan speed.

With spiral scans 300, parameters such as overlap, divergence, and scan speed can be changed when a continuous scan is being performed as depicted in this figure.

The total overlap can be distributed to provide greater amounts of overlap in some parts of the path as compared to other parts of the path with the total overlap being the same as the path in which the amount of overlap does not change.

For example, the error in two-dimensional probability density function for pointing error angles is as follows:

$$\int_0^{\theta_U} f(\theta)\cdot p(\theta)\cdot 2\pi\theta d\theta \text{ where } f(\theta)=\frac{1}{2\pi\sigma^2}\exp\left(-\frac{\theta^2}{2\sigma^2}\right)$$

where $\theta_U$ is the half-width of the field of view (FOV) and $p(\theta)$ is the probability of a "hit" if a satellite is present at angle $\theta$. For a given jitter spectrum and beam power, $p(\theta)$ depends on beam overlap, scan speed, and beam divergence.

To maximize the probability of a "hit" for a fixed scan time, a number of scan parameters can be selected to at least one of uniquely distribute beam overlap, scan speed, or beam divergence over the scan such that $p(\theta)$ does not change scan time but rather maximizes the integral.

To minimize the scan time for a fixed probability of a "hit", a number of scan parameters can be selected to at least one of uniquely distribute beam overlap, scan speed, and/or beam divergence over the scan such that $p(\theta)$ does not change the integral but rather reduces scan time.

In both cases, as the scan progresses, scan parameters such as at least one of beam overlap, scan speed, or beam divergence can be selected to at least one of decrease or increase.

The illustration of spiral scans 300 in FIG. 3 is presented as an example of one manner in which spiral scans can be implemented. This example is not meant to limit the manner in which other spiral scans can be implemented and what scan parameters can be changed in other examples. Further, although a single parameter such as overlap in spiral scan 301, divergence in spiral scan 311, scan speed in spiral scan 321 is changed, multiple scan parameters can change during the movement of the laser beam in other examples.

Figure 4:
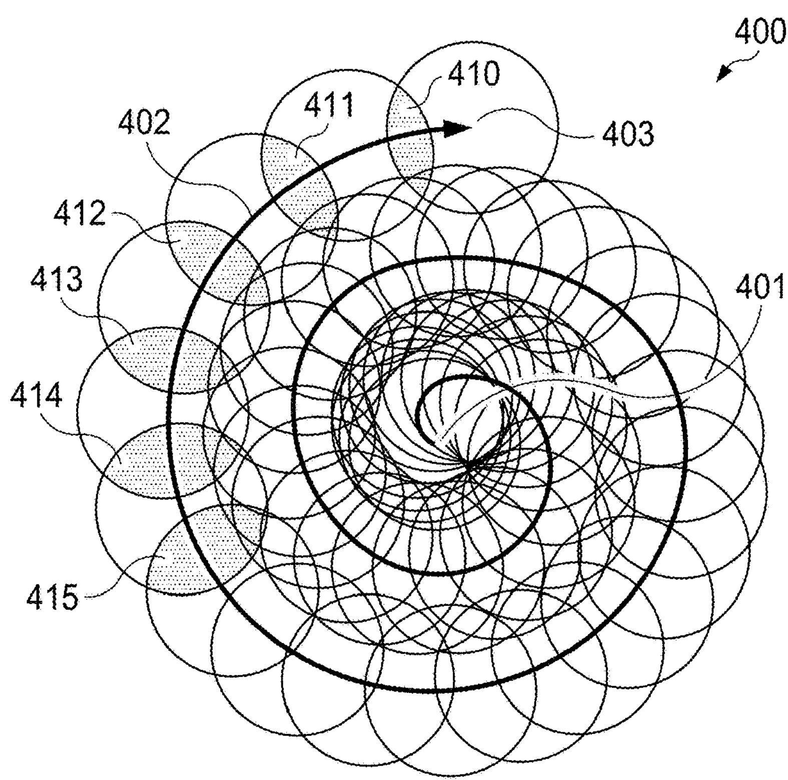
FIG. 4 is an illustration of scan speed for a spiral scan in accordance with an illustrative embodiment.

Turning next to FIG. 4, an illustration of scan speed for a spiral scan is depicted in accordance with an illustrative embodiment. In this example, spiral scan 400 is depicted in which each circle represents a location for a beam spot at a particular point in time. In this example, path 402 represents a path with a direction of motion of the beam spot on a plane in space as the beam spot moves on path 402 in spiral scan 400 from central location 401 to outer location 403.

In this example, overlap is present between locations in the direction of path 402. In this example, instances in time are equally spaced, and the overlap between two adjacent circles indicates the scan speed as shown by the regions. For example, region 410, region 411, region 412, region 413, region 414, and region 415 are examples of regions of overlap that can be used to indicate the scan speed.

In these examples, the greater amount of overlap results in a larger region that indicates a slower scan speed than a lesser amount of overlap with a smaller region. For example, the beam is scanning faster in spiral scan 400 at the portion of the scan with region 410 as compared to the portion of the scan with region 415. This overlap can also be referred to as motion overlap which can illustrate scan speed as a function of location in spiral scan 400.

Figure 5:
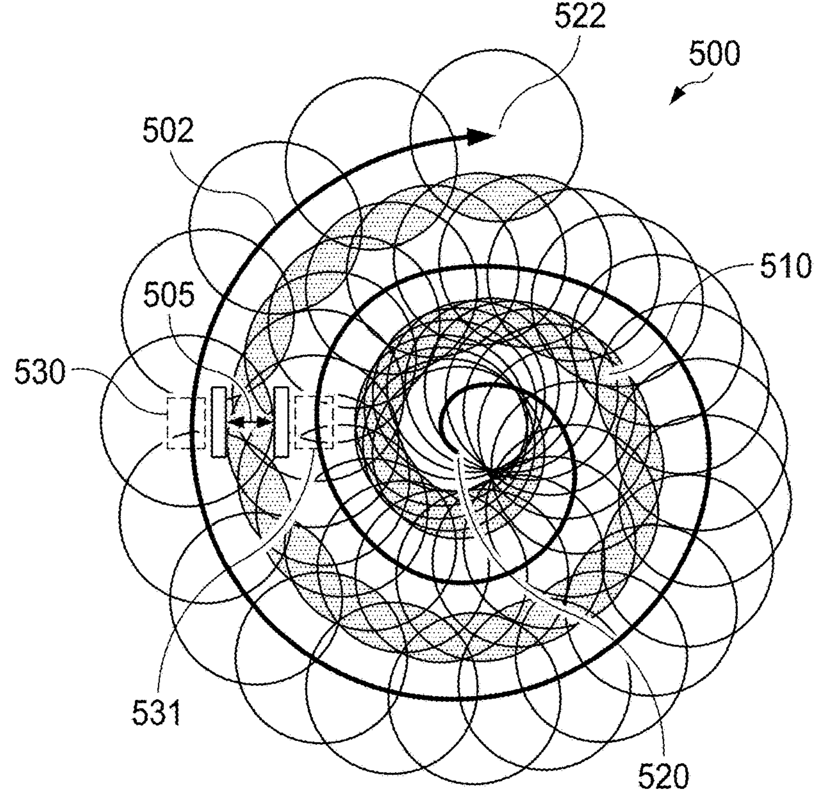
FIG. 5 is an illustration of an overlap in accordance with an illustrative embodiment.

In FIG. 5, an illustration of an overlap is depicted in accordance with an illustrative embodiment. In this illustrative example, spiral scan 500 comprises circles that represent a location for a beam spot at a particular point in time. In this example, path 502 represents the direction of motion of the beam spot on a path with a direction of motion on a plane in space as the beam spot moves on path 502 for spiral scan 500.

As depicted, overlap 510 is present between the adjacent portions of path 502 in spiral scan 500. In this example, the scan begins at central location 520 and ends at outer location 522.

In this illustrative example, the overlap of beam spot locations between two adjacent portions of path 502 is an overlap between the locations in the adjacent portions of path 502. For example, portion 530 of path 502 is adjacent to portion 531 of path 502.

In this example, the overlap is between a first location and a second location that is perpendicular to the direction of motion. In this example, overlap 510 has width 505. This width is constant along path 502 in this example but can be changed for different portions of path 502 in other examples such that the overlap between locations of the beam spot changes during movement of the beam spot on path 502. This overlap can be referred to as a path overlap and can be used to increase the probability of detecting an object such as a satellite while minimizing the time to scan a search area. In these examples, the probability of detecting the satellite is dependent in part on overlap 510 of adjacent portions of path 502.

The illustration of motion overlap in FIG. 4 and path overlap in FIG. 5 are provided as examples and not meant to limit the manner in which other illustrative examples can be implemented. For example, other scans can have other lengths. Further, in other scans, divergence can be different for different portions of the path.

Figure 6:
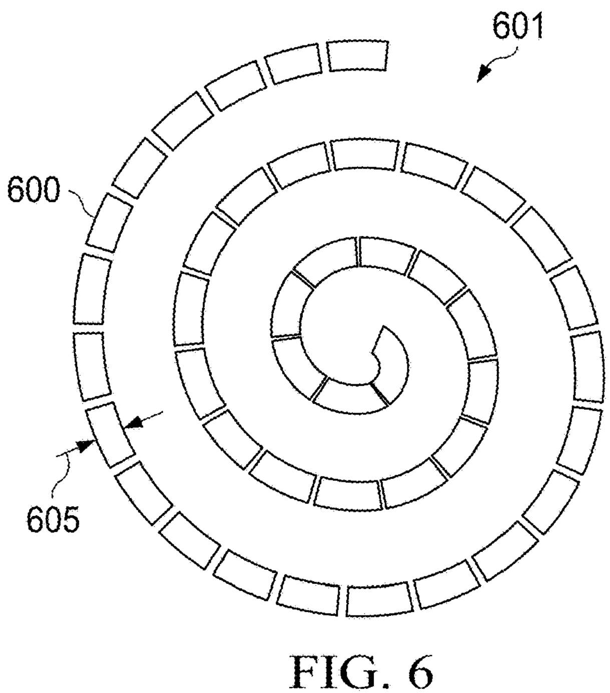
FIG. 6 is an illustration of an overlap for a spiral scan in accordance with an illustrative embodiment.

With reference to FIG. 6, an illustration of an overlap for a spiral scan is depicted in accordance with an illustrative embodiment. As depicted, overlap 600 represents the area where locations for a spot overlap as the laser beam is moved along a spiral path. In this example, overlap 600 is shown as being the same throughout a spiral scan. In this example, overlap 600 is divided into segments 601. In this example, the segments each have the same length. These segments are shown as having the same thickness, meaning that each segment has the same amount of overlap. In this example, overlap 600 has width 605.

In this illustrative example, the overlap can be selected to increase the ability to detect a jumper. In this example, a jumper is an object that is missed by a laser beam that is pointed to a location in which the object is located. The laser beam can miss the object because of beam vibrations. These beam vibrations can be caused by jitter. From the laser beam's frame of reference, the object appears to "jump" outside of the beam spot.

The overlap where the spot of the laser beam on the current portion of a path overlaps a prior portion of the path or overlaps a future portion of the path can increase the ability to detect a jumper.

The amount of overlap in different segments of the path can be selected such that the time needed to scan the entire path is the same as if the spiral path used the same amount of overlap for the entire path. In other words, different segments can have different amounts of overlap such that the total overlap present along the spiral path for the segments can be the same as the total overlap for a path in which the amount of overlap is the same along the spiral path.

Figure 7:
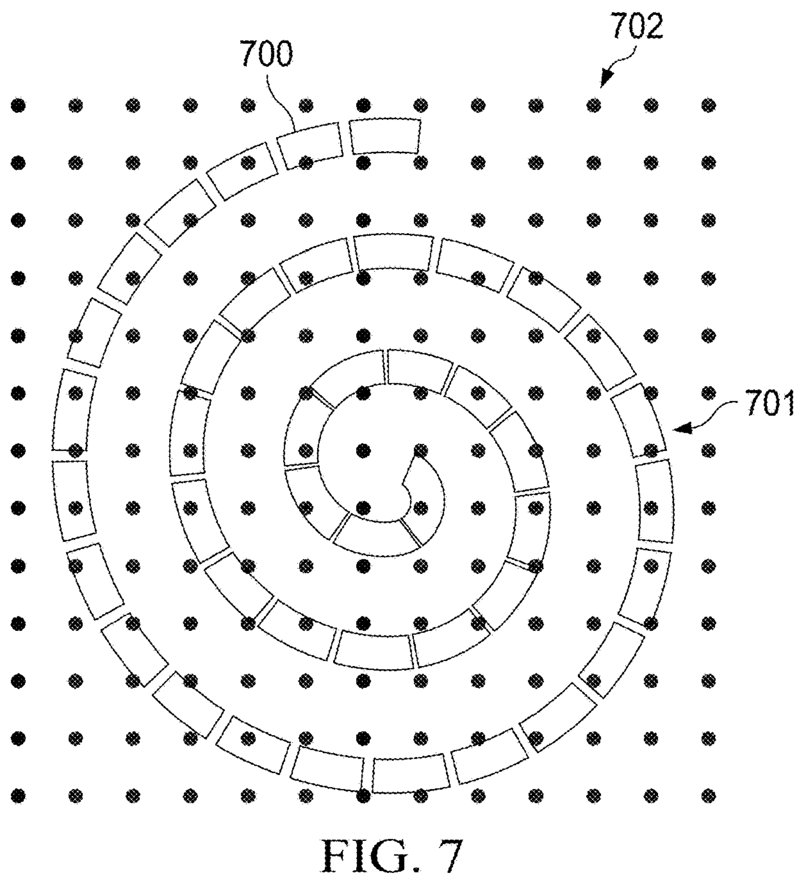
FIG. 7 is an illustration of an overlap based on jumper distribution in accordance with an illustrative embodiment.

Turning next to FIG. 7, an illustration of an overlap based on jumper distribution is depicted in accordance with an illustrative embodiment. In this illustrative example, overlap 700 is comprised of segments 701. Jumpers 702 are shown as dots.

A jumper can cause the laser beam to miss the intended location for generating backscatter light to make a measurement at the location. In other words, that measurement can be clear air turbulence. The location to which the jumper causes backscatter light may have an absence of clear air turbulence. As a result, jumpers can reduce the accuracy of measurements when scanning an area. A similar issue can occur if the scanning is being performed to identify objects such as insects in the area.

If most jumpers are located at the center of an area, the amount of overlap can be greater in those areas as compared to other areas. As a result, greater overlap is present for segments closer to the center with segments father away from the center having less overlap.

In this example, a uniform distribution of jumpers 702 are shown in this figure. With this distribution, segments 701 in overlap 700 can all have the same amount of overlap because the segments can detect jumpers 702 equally because of the uniform distribution based on the likelihood that the object of interest is at center 812.

Figure 8:
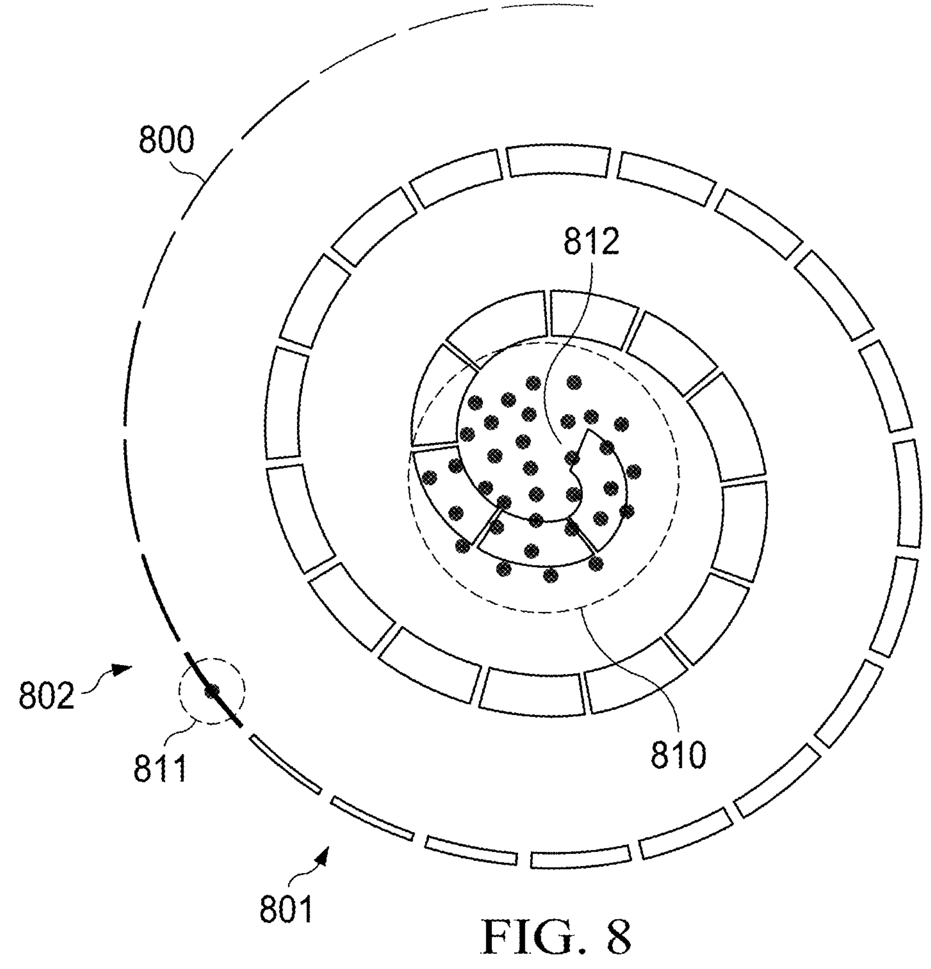
FIG. 8 is an illustration of an overlap based on jumper distribution in accordance with an illustrative embodiment.

Next in FIG. 8, an illustration of an overlap based on a jumper distribution is depicted in accordance with an illustrative embodiment. In this example, overlap 800 is comprised of segments 801. In this example, jumpers 802 are present. With this example, most of jumpers 802 are located in region 810 with a single jumper being located in region 811.

With most of jumpers 802 located in center 812 of the spiral, the segments located near center 812 detect more jumpers. Thus, these segments have a high value. Likewise, only a single jumper is located in region 811. The segments located near the edge detect very few jumpers. These segments have a low value.

In this example, the object of interest has the highest probability of being at or near center 812. In other examples, the flight path passes through center 812.

As a result, the importance of making measurements to detect an object are more important at center 812 than at the end of the scan. The measurements may have a curve with a Gaussian shape. For example, the breadth of the Gaussian shape can be a standard deviation (STD) determined by the distance of the area being scanned in front of the aircraft. For example, the standard deviation at 30 meters is smaller than the standard deviation at 10 kilometers. Further, a cross wind can shift the center of the Gaussian curve towards the direction from which the wind originates.

The illustration of overlaps in FIGS. 6-8 have been provided as examples and are not meant to limit the manner in which other illustrative examples can be implemented. For example, segments can increase in overlap at least in portions of the path as compared to other portions. The selection of which segments have greater overlap can be based on the probability that jumpers are located in different portions of the path for the spiral scan.

Further, the illustrative examples depicted in FIGS. 3-8 can be applied to other types of electromagnetic beams in addition to or in place of laser beams. For example, these different examples can also be applied to a radio frequency beam, a microwave beam, or other electromagnetic beams.

Further, the illustrative examples depicted in FIGS. 3-8 can be applied to other types of electromagnetic beams in addition to or in place of laser beams. For example, these different examples can also be applied to a radio frequency beam, a microwave beam, or other electromagnetic beams.

Figure 9:
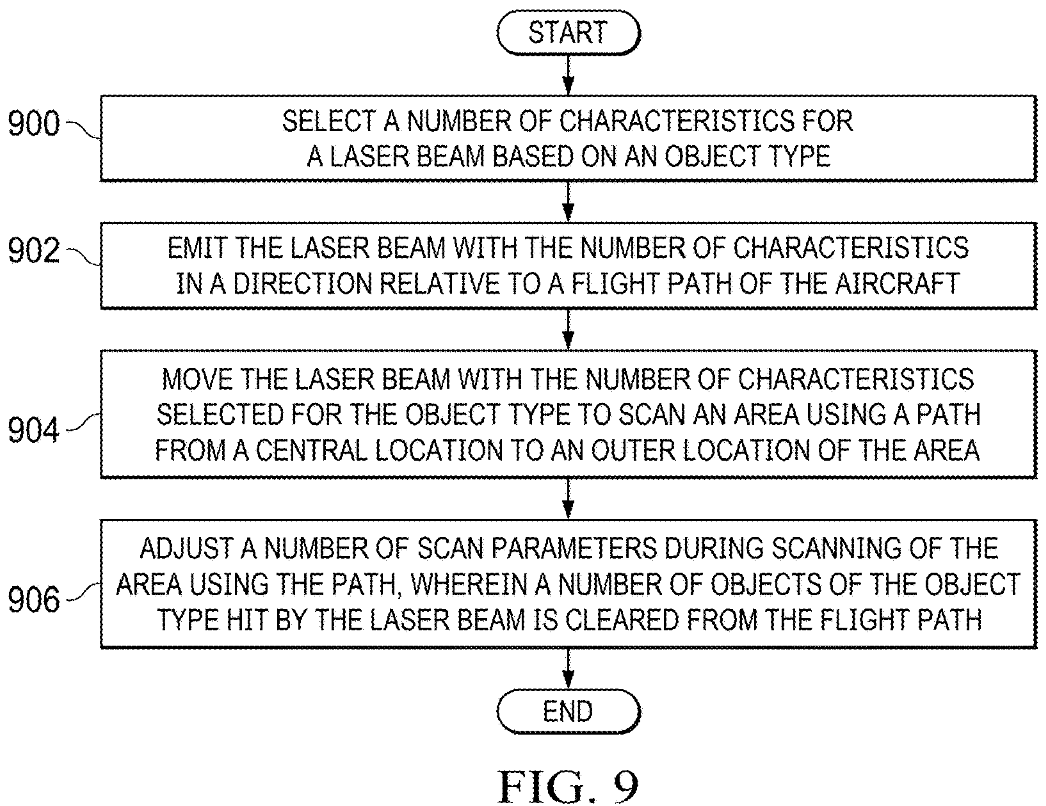
FIG. 9 is an illustration of a flowchart of a process for clearing a flight path for an aircraft in accordance with an illustrative embodiment.

Turning next to FIG. 9, an illustration of a flowchart of a process for clearing a flight path for an aircraft is depicted in accordance with an illustrative embodiment. The process in FIG. 9 can be implemented in hardware, software, or both. When implemented in software, the process can take the form of program instructions that are run by one of more processor units located in one or more hardware devices in one or more computer systems. For example, the process can be implemented in controller 214 in computer system 212 in FIG. 2.

The process selects a number of characteristics for a laser beam based on an object type (operation 900). The process emits the laser beam with the number of characteristics in a direction relative to a flight path of the aircraft (operation 902).

The process moves the laser beam with the number of characteristics selected for the object type to scan an area using a path from a central location to an outer location of the area (operation 904). The process adjusts a number of scan parameters during scanning of the area using the path, wherein a number of objects of the object type hit by the laser beam is cleared from the flight path (operation 906). The process terminates thereafter.

Figure 10:
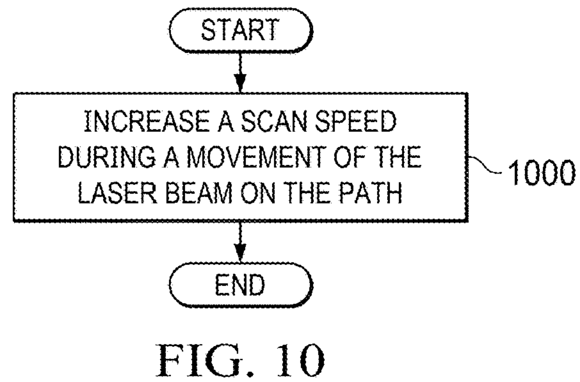
FIG. 10 is an illustration of a flowchart of a process for adjusting a number of scan parameters in accordance with an illustrative embodiment.

In FIG. 10, an illustration of a flowchart of a process for adjusting a number of scan parameters is depicted in accordance with an illustrative embodiment. The process in this flowchart is an example of an implementation for operation 902 in FIG. 9. This process can be performed when the laser beam is moved with a continuous movement.

The process increases a scan speed during a movement of the laser beam on the path (operation 1000). The process terminates thereafter. The process can be repeated as needed for the same area when additional scan time is available.

Figure 11:
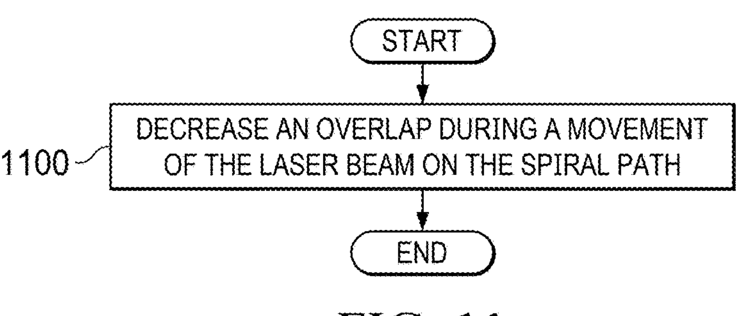
FIG. 11 is an illustration of a flowchart of a process for adjusting a number of scan parameters in accordance with an illustrative embodiment.

With reference to FIG. 11, an illustration of a flowchart of a process for adjusting a number of scan parameters is depicted in accordance with an illustrative embodiment. The process in this flowchart is an example of an implementation for operation 902 in FIG. 9. In this example, the path is a spiral path.

The process decreases an overlap during a movement of the laser beam on the spiral path (1100). The process terminates thereafter. The process can be repeated as needed for the same area when additional scan time is available.

Figure 12:
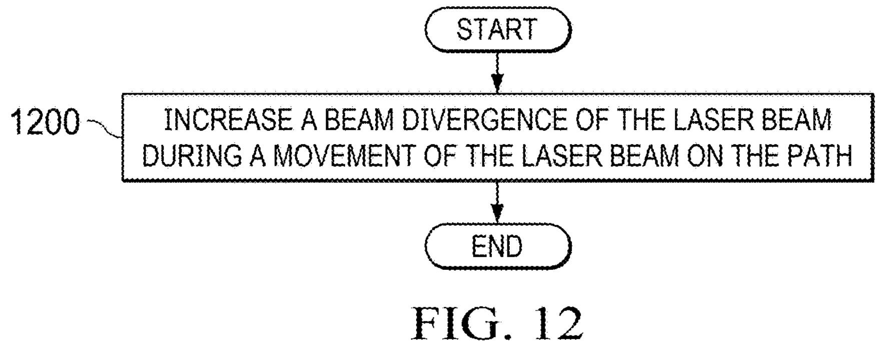
FIG. 12 is an illustration of a flowchart of a process for adjusting a number of scan parameters in accordance with an illustrative embodiment.

Next in FIG. 12, an illustration of a flowchart of a process for adjusting a number of scan parameters is depicted in accordance with an illustrative embodiment. The process in this flowchart is an example of an implementation for operation 902 in FIG. 9.

The process increases a beam divergence of the laser beam during a movement of the laser beam on the path (operation 1200). The process terminates thereafter.

Figure 13:
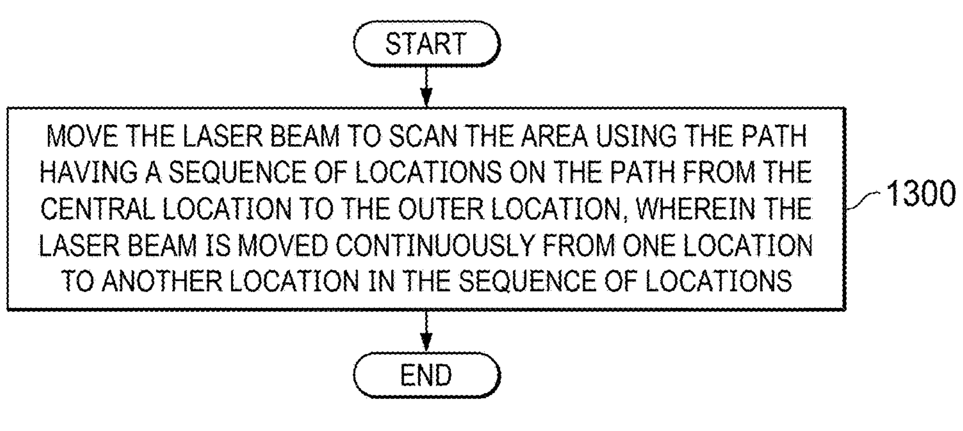
FIG. 13 is an illustration of a flowchart of a process for moving a laser beam in accordance with an illustrative embodiment.

With reference now to FIG. 13, an illustration of a flowchart of a process for moving a laser beam is depicted in accordance with an illustrative embodiment. The process in this flowchart is an example of an implementation for operation 904 in FIG. 9.

The process moves the laser beam to scan the area using the path having a sequence of locations on the path from the central location to the outer location, wherein the laser beam is moved continuously from one location to another location in the sequence of locations (operation 1300). The process terminates thereafter.

Figure 14:
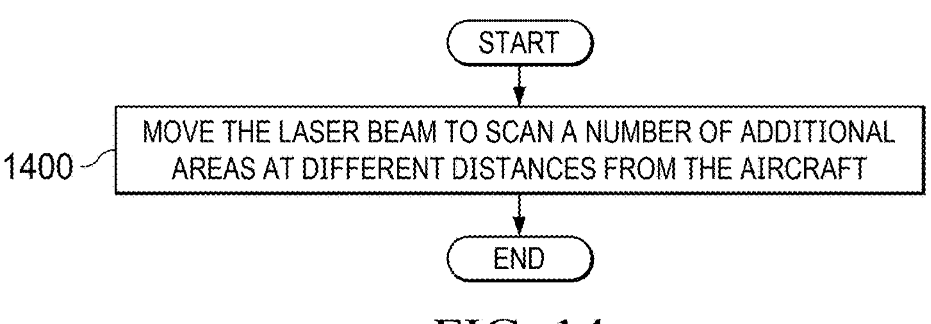
FIG. 14 is an illustration a flowchart of a process for making measurements for a volume in accordance with an illustrative embodiment.

Turning next to FIG. 14, an illustration of a flowchart of a process for making measurements for a volume is depicted in accordance with an illustrative embodiment. The operations in this flowchart are additional operations that can be performed by the operations in FIG. 9.

The process moves the laser beam to scan a number of additional areas at different distances from the aircraft (operation 1400). The process terminates thereafter.

In this example, the laser beam can clear a number of objects from within a volume in the atmosphere. Also in this example, the flight path extends through the volume and the central location of each additional area can be the location where the flight path extends through the additional area.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program instructions, hardware, or a combination of the program instructions and hardware. When implemented in hardware, the hardware can, for example, take the form of integrated circuits that are manufactured or configured to perform one or more operations in the flowcharts or block diagrams. When implemented as a combination of program instructions and hardware, the implementation may take the form of firmware. Each block in the flowcharts or the block diagrams can be implemented using special purpose hardware systems that perform the different operations or combinations of special purpose hardware and program instructions run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 15:
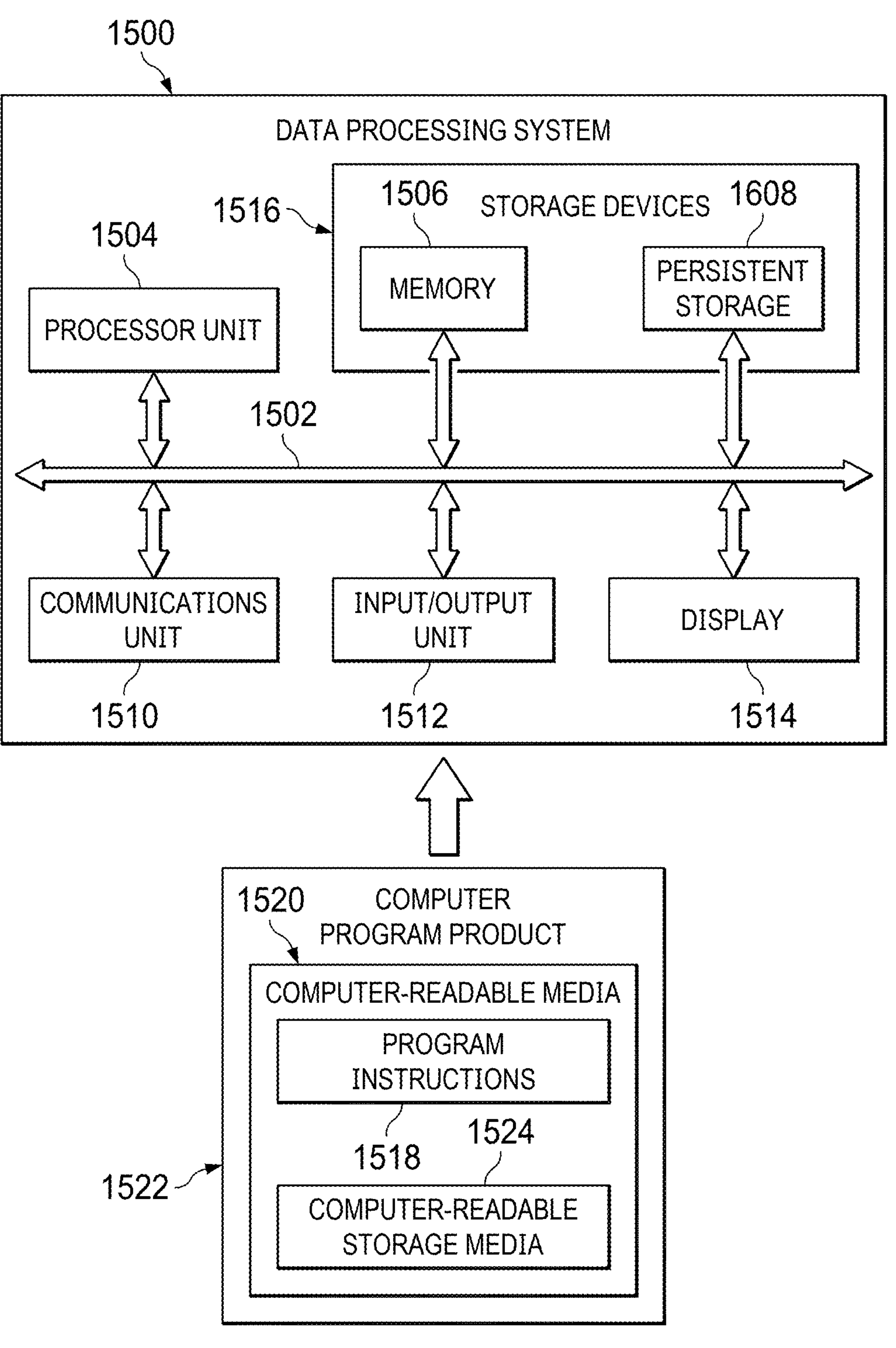
FIG. 15 is an illustration of a block diagram of a data processing system in accordance with an illustrative embodiment.

Turning now to FIG. 15, a block diagram of a data processing system is depicted in accordance with an illustrative embodiment. Data processing system 1500 can also be used to implement computer system 212 in FIG. 2. In this illustrative example, data processing system 1500 includes communications framework 1502, which provides communications between processor unit 1504, memory 1506, persistent storage 1508, communications unit 1510, input/output (I/O) unit 1512, and display 1514. In this example, communications framework 1502 takes the form of a bus system.

Processor unit 1504 serves to execute instructions for software that can be loaded into memory 1506. Processor unit 1504 includes one or more processors. For example, processor unit 1504 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1504 can be implemented using one or more heterogeneous processor systems in which a main processor is present with secondary processors on a single chip. As another illustrative example, processor unit 1504 can be a symmetric multi-processor system containing multiple processors of the same type on a single chip.

Memory 1506 and persistent storage 1508 are examples of storage devices 1516. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 1516 may also be referred to as computer-readable storage devices in these illustrative examples. Memory 1506, in these examples, can be, for example, a random-access memory or any other suitable volatile or non-volatile storage device. Persistent storage 1508 may take various forms, depending on the particular implementation.

For example, persistent storage 1508 may contain one or more components or devices. For example, persistent storage 1508 can be a hard drive, a solid-state drive (SSD), a flash memory, a rewritable optical disk, a rewritable magnetic tape, or some combination of the above. The media used by persistent storage 1508 also can be removable. For example, a removable hard drive can be used for persistent storage 1508.

Communications unit 1510, in these illustrative examples, provides for communications with other data processing systems or devices. In these illustrative examples, communications unit 1510 is a network interface card.

Input/output unit 1512 allows for input and output of data with other devices that can be connected to data processing system 1500. For example, input/output unit 1512 may provide a connection for user input through at least one of a keyboard, a mouse, or some other suitable input device.

Further, input/output unit 1512 may send output to a printer. Display 1514 provides a mechanism to display information to a user.

Instructions for at least one of the operating system, applications, or programs can be located in storage devices 1516, which are in communication with processor unit 1504 through communications framework 1502. The processes of the different embodiments can be performed by processor unit 1504 using computer-implemented instructions, which may be located in a memory, such as memory 1506.

These instructions are referred to as program instructions, computer usable program instructions, or computer-readable program instructions that can be read and executed by a processor in processor unit 1504. The program instructions in the different embodiments can be embodied on different physical or computer-readable storage media, such as memory 1506 or persistent storage 1508.

Program instructions 1518 are located in a functional form on computer-readable media 1520 that is selectively removable and can be loaded onto or transferred to data processing system 1500 for execution by processor unit 1504. Program instructions 1518 and computer-readable media 1520 form computer program product 1522 in these illustrative examples. In the illustrative example, computer-readable media 1520 is computer-readable storage media 1524.

Computer readable storage media 1524 is a physical or tangible storage device used to store program instructions 1518 rather than a medium that propagates or transmits program instructions 1518. Computer-readable storage media 1524 may be at least one of an electronic storage medium, a magnetic storage medium, an optical storage medium, an electromagnetic storage medium, a semiconductor storage medium, a mechanical storage medium, or other physical storage medium. Some known types of storage devices that include these mediums include a diskette, a hard disk, a random access memory (RAM), a read-only memory (ROM), an erasable programmable read-only memory (EPROM or Flash memory), a static random access memory (SRAM), a compact disc read-only memory (CD-ROM), a digital versatile disk (DVD), a memory stick, a floppy disk, a mechanically encoded device, such as punch cards or pits/lands formed in a major surface of a disc, or any suitable combination thereof.

Computer-readable storage media 1524, as that term is used in the present disclosure, is not to be construed as storage in the form of transitory signals per se, such as at least one of radio waves or other freely propagating electromagnetic waves, electromagnetic waves propagating through a waveguide, light pulses passing through a fiber optic cable, electrical signals communicated through a wire, or other transmission media.

Further, data can be moved at some occasional points in time during normal operations of a storage device. These normal operations include access, de-fragmentation or garbage collection. However, these operations do not render the storage device as transitory because the data is not transitory while the data is stored in the storage device.

Alternatively, program instructions 1518 can be transferred to data processing system 1500 using a computer-readable signal media. The computer-readable signal media are signals and can be, for example, a propagated data signal containing program instructions 1518. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1520" can be singular or plural. For example, program instructions 1518 can be located in computer-readable media 1520 in the form of a single storage device or system. In another example, program instructions 1518 can be located in computer-readable media 1520 that is distributed in multiple data processing systems. In other words, some instructions in program instructions 1518 can be located in one data processing system while other instructions in program instructions 1518 can be located in another data processing system. For example, a portion of program instructions 1518 can be located in computer-readable media 1520 in a server computer while another portion of program instructions 1518 can be located in computer-readable media 1520 located in a set of client computers.

The different components illustrated for data processing system 1500 are not meant to provide architectural limitations to the manner in which different embodiments can be implemented. In some illustrative examples, one or more of the components may be incorporated in or otherwise form a portion of, another component. For example, memory 1506, or portions thereof, may be incorporated in processor unit 1504 in some illustrative examples. The different illustrative embodiments can be implemented in a data processing system including components in addition to or in place of those illustrated for data processing system 1500. Other components shown in FIG. 15 can be varied from the illustrative examples shown. The different embodiments can be implemented using any hardware device or system capable of running program instructions 1518.

Thus, the illustrative embodiments provide a method, apparatus, and computer program product for clearing a flight path. In one illustrative example, a method clears a flight path for aircraft. A number of characteristics is selected for a laser beam based on an object type. The laser beam is emitted with the number of characteristics in a direction relative to a flight path of the aircraft. The laser beam with the number of characteristics selected for the object type is moved to scan an area using a path from a central location to an outer location of the area. A number of scan parameters is adjusted during scanning the area using the path. A number of objects of the object type hit by the laser beam is cleared from the flight path.

One or more of the scan parameters can be adjusted to maintain a desired scan time. For example, with an amount of overlap, the overlap can be increased for an entire path. However, the increase to the overlap for the entire path increases the amount of scan time. In the illustrative examples, portions of the path can have a greater overlap as compared to other portions. Having a greater overlap can be important to the portion of the path that is closest to the flight path of the aircraft extended to the area being scanned. The portions selected with a greater overlap are closer to the flight path as compared to other portions. The resulting portions can have a lower amount of overlap. As a result, by changing the overlap, the scan time can be maintained as compared to adding a greater overlap throughout the entire path.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A flight path clearing system that comprises:
- a laser beam system in an aircraft; and
- a controller configured to:
  - select a number of characteristics for a laser beam based on an object type; and
  - control the laser beam system to:
    - emit the laser beam with the number of characteristics in a direction relative to a flight path of the aircraft;
    - move the laser beam with the number of characteristics selected for the object type to scan an area using a path from a central location to an outer location of the area; and
  - adjust, during scanning of the area using the path, a number of scan parameters selected from at least one of: a scan speed, an overlap, or a beam divergence, wherein a number of objects of the object type hit by the laser beam is cleared from the flight path.

2. The flight path clearing system of claim 1, wherein in adjusting the number of scan parameters, the controller is configured to control the laser beam system to:
- increase a scan speed during a movement of the laser beam on the path.

3. The flight path clearing system of claim 1, wherein the path is a spiral path wherein in adjusting the number of scan parameters, the controller is configured to:
- decrease an overlap during a movement of the laser beam on the spiral path.

4. The flight path clearing system of claim 1, wherein in adjusting the number of scan parameters, the controller is configured to:
- increase a beam divergence of the laser beam during a movement of the laser beam on the path.

5. The flight path clearing system of claim 1, wherein the number of characteristics of the laser beam comprises at least one of a wavelength, focal length, a power, a timing, or an intensity.

6. The flight path clearing system of claim 5, wherein the focal length is selected such that the laser beam scans the area at a distance from the aircraft that enables the laser beam to clear the flight path.

7. The flight path clearing system of claim 5, wherein the timing is selected from a group comprising pulsed and continuous.

8. The flight path clearing system of claim 1, wherein the-controller is in the aircraft.

9. The flight path clearing system of claim 1, wherein the flight path extends through the central location of the area.

10. The flight path clearing system of claim 1, wherein the laser beam system is selected from at least one of a gas laser beam system or a carbon dioxide laser beam system.

11. The flight path clearing system of claim 1, wherein the object type is an aerial drone.

12. The flight path clearing system of claim 1, wherein clearing an aerial drone as the number of objects from the flight path comprises causing at least one of interference with a navigation system of the aerial drone, the aerial drone to fly outside of the flight path of the aircraft, damage to the aerial drone, or a destruction of the aerial drone such that the aerial drone moves away from the flight path of the aircraft.

13. A method for clearing a flight path for an aircraft, the method comprising:
- selecting a number of characteristics for a laser beam based on an object type;
- emitting the laser beam with the number of characteristics in a direction relative to a flight path of the aircraft;
- moving the laser beam with the number of characteristics selected for the object type to scan an area using a path from a central location to an outer location of the area; and
- adjusting, during scanning of the area using the path, a number of scan parameters selected from at least one of: a scan speed, an overlap, or a beam divergence, wherein a number of objects of the object type hit by the laser beam is cleared from the flight path.

14. The method of claim 13, wherein adjusting the number of scan parameters comprises:
- increasing a scan speed during a movement of the laser beam on the path.

15. The method of claim 13, wherein the path is a spiral path, wherein adjusting the number of scan parameters comprises:
- decreasing an overlap during a movement of the laser beam on the spiral path.

16. The method of claim 13, wherein adjusting the number of scan parameters comprises:
- increasing a beam divergence of the laser beam during a movement of the laser beam on the path.

17. The method of claim 13, wherein adjusting the number of scan parameters comprises:
- decreasing during a movement of the laser beam on the path.

18. The method of claim 13, wherein the number of characteristics of the laser beam comprises at least one of: a wavelength, a focal length, a power, a timing, or an intensity.

19. The method of claim 18, wherein the focal length is selected such that the laser beam scans the area at a distance from the aircraft that enables the laser beam to clear the flight path.

20. The method of claim 18, wherein the timing is selected from a group comprising pulsed and continuous.

21. The method of claim 13, further comprising controlling the moving and emitting of the laser beam by a controller in the aircraft.

22. The method of claim 13, wherein the flight path extends through the central location of the area.

* * * * *